April 20, 1965 R. D. BAUMAN 3,179,893
VARIABLE PULSE WIDTH GENERATOR CONTROLLED BY
VARYING OF D.C. SCREEN GRID POTENTIAL
Filed Nov. 8, 1961

INVENTOR.
RICHARD D. BAUMAN
BY John F. Fawle
ATTORNEY 3,179,893

VARIABLE PULSE WIDTH GENERATOR CONTROLLED BY VARYING OF D.C. SCREEN GRID POTENTIAL

Richard D. Bauman, San Jose, Calif., assignor to Sylvania Electric Products Inc., a corporation of Delaware Filed Nov. 8, 1961, Ser. No. 150,928
3 Claims. (Cl. 328—58)

This invention relates to pulse generators, and more particularly to a variable pulse width generator.

Accurate control of the shape and width of pulse signals is highly desirable in various microwave circuits such as gating circuits. There is considerable advantage in achieving this control by electrical means, such as varying a voltage. The mono-stable multivibrator, a common circuit using this type of pulse width control, has the disadvantages of producing poor pulse shapes as the pulse width is varied and of producing minimum pulse widths of 0.1 to 0.2 microsecond.

In accordance with this invention, a blocking oscillator is utilized to generate pulses, and control of pulse width is accomplished by varying the screen grid voltage of the oscillator pentode. Pulses with extremely short widths (less than 0.1 microsecond) and with substantially rectangular shapes are readily obtainable with such control.

An object of this invention is the provision of a pulse generator having a voltage control for varying the width of an output pulse of less than 0.1 microsecond and for preserving rectangularity of the pulse over the range of pulse widths.

Other objects of the invention will become apparent from the following description of a preferred embodiment thereof, reference being had to the accompanying drawings in which.

Figure 1:
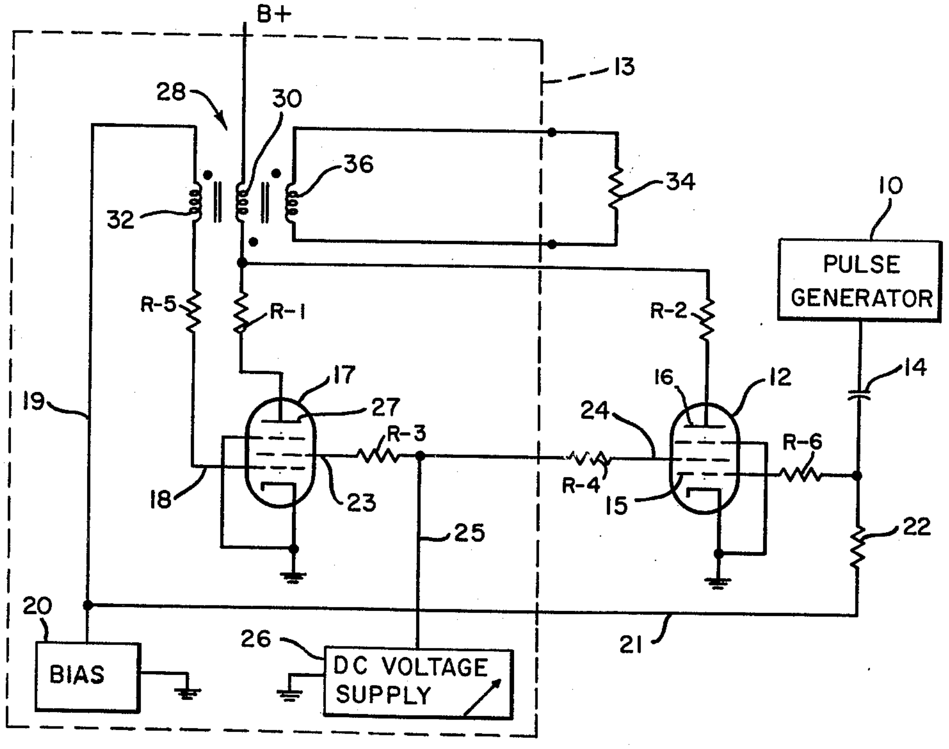
FIGURE 1 is a schematic diagram of a pentode blocking oscillator circuit embodying this invention.

A preferred embodiment of this invention is shown in FIGURE 1 and comprises a pulse generator 10, a trigger tube 12, and a blocking oscillator circuit generally indicated at 13. The output of generator 10 is coupled through condenser 14 to the control grid 15 of trigger tube 12, which may be a pentode, as shown.

The oscillator circuit 13 comprises a vacuum tube 17, preferably a pentode, the control grid 18 of which is normally biased below cutoff by connection via line 19 to a bias voltage source 20. This source is also connected by line 21 through grid leak resistor 22 to control grid 15 of trigger tube 12 so that the latter is normally biased below cutoff.

Screen grids 23 and 24 of the oscillator tube 17 and trigger tube 12, respectively, are connected by line 25 to a variable voltage supply 26, which biases the screen grids positively. Plate 27 of tube 17 is regeneratively coupled to grid 18 by transformer 28 having primary winding 30 and secondary winding 32 connected to the plate and grid, respectively. The output of the circuit 13 is taken across load resistor 34 connected to tertiary winding 36 of transformer 28. Resistors R1 through R6, inclusive, are employed as secondary oscillation suppressors.

A positive pulse is coupled from pulse generator 10, through coupling capacitor 14, to control grid 15 of trigger tube 12 and, through secondary winding 32, to control grid 18 of tube 17 to cause the tubes to conduct.

As a result of the direct coupling of the input pulse to the control grid 15, trigger tube 12 is driven into conduction more rapidly than is tube 17. The sharp decrease in the potential of plate 16 of trigger tube 12 causes the potential of plate 27 of tube 17 to fall sharply to decrease the net turn-on time of tube 17. The direct coupling of the plates 16 and 27 of tubes 12 and 17, respectively, forces the potential of plate 27 to follow the potential of plate 16 to cause tube 17 to be driven into conduction more rapidly than if trigger tube 12 were not in the circuit.

Figure 2:
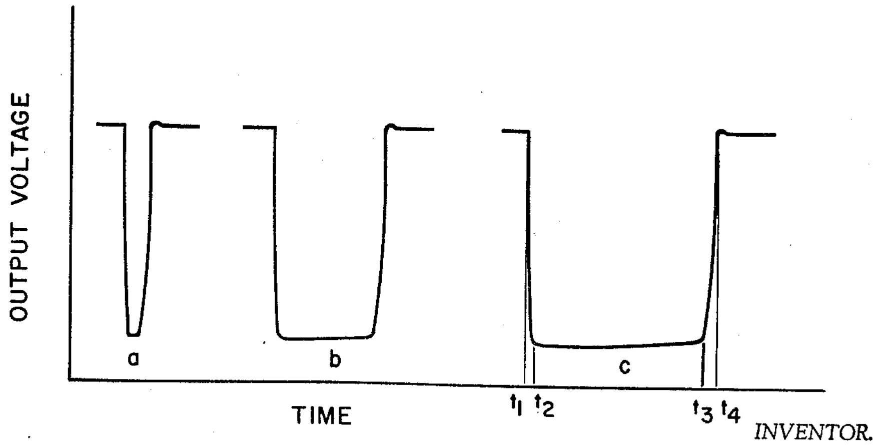
FIGURE 2 shows typical output voltage waveforms of the blocking oscillator in which (*a*) Is the minimum pulse width condition,
(*b*) Is the nominal pulse width condition, and
(*c*) Is the maximum pulse width condition.

In accordance with this invention, the width of the blocking oscillator output pulse is controlled by varying the potential on the screen grid 23 of the tube 17. The blocking oscillator output pulse is illustrated in FIGURES 2*a*, *b* and *c* for different voltages on screen grid 23.

In response to a control pulse on line 19, tube 17 quickly conducts a large amount of current and the signal voltage $e_L$ developed across winding 30 at time $t_2$ (see FIGURE 2*c*) is approximately equal to the supply potential B+. The signal voltage $e_L$ is proportional to the rate of change of the magnetization current $i_m$ in winding 30 and is represented as $$e_L = L\frac{d(i_m)}{d(t)} = E_{bb} - E_b \qquad (1)$$

where $E_{bb}$ is the supply potential B+, $E_b$ is the potential on plate 27, L is the magnetizing inductance of winding 30, $i_m$ is the magnetization current and $$\frac{d(i_m)}{d(t)}$$

is rate of change with respect to time.

During time $t_2$ to $t_3$ (see FIGURE 2*c*), conduction of tube 17 increases and the magnetization current in winding 30 increases approximately linearly. Thus, the rate of change of the magnetization current, $$\left(\frac{d(i_m)}{d(t)}\right)$$

and therefore the magnitude of signal voltage $e_L$, is constant between time $t_2$ to $t_3$. At time $t_3$, tube 17 saturates and can no longer deliver the required increase in magnetization current. Regenerative action occurs between time $t_3$ to $t_4$ (see FIGURE 2*c*) and tube 17 is quickly cut off.

The effective value $I_m$ of the magnetization current obtained by integrating Equation 1 is proportional to the pulse width $t_p$ of the signal voltage $e_L$ and is represented as $$I_m = \left(\frac{E_{bb} - E_b}{L}\right) t_p \qquad (2)$$

The magnetization current $I_m$ is the difference between the plate current $I_b$ and the sum of the control grid current $I_g$ and load current $I_l$ of pentode 17 and is represented as $$I_m = I_b - (I_g + I_l) \qquad (3)$$

Since the control grid and load currents are small, the magnetization current is primarily controlled by the plate current of pentode 17. The plate current of a pentode vacuum tube is a function of the screen grid voltage $E_{sg}$ and is represented as $$I_b = f\left[K\left(E_c + \frac{E_{sg}}{\mu_s}\right)^{3/2}\right] \qquad (4)$$

where K and $\mu_s$ are constants. Thus, the saturation current of tube 17 and magnetization current in winding 30 (and therefore the pulse width of the signal voltage $e_L$) are controlled by varying the screen grid potential on pentode 17.

What is claimed is:

1. An oscillator circuit comprising a multi-grid vacuum tube having at least a plate electrode, a control grid electrode, a screen grid electrode, and a cathode, a power source, a transformer having a primary winding electrically connected to said plate electrode and to said power source, a secondary winding regeneratively coupled to the said control grid electrode and electrically connected to said power source, and a tertiary winding adapted to be connected to an output load, biasing means electrically connected to said control gird electrode for normally maintaining said vacuum tube in a non-conducting state, means for generating a control pulse, means for coupling said control pulse to said control grid electrode, means for electrically connecting said cathode to the power source, a source of unidirectional voltage electrically connected to said screen grid electrode, and means to vary the magnitude of said voltage whereby to control the width of a pulse at the output load.

2. An oscillator circuit comprising a pentode vacuum tube having a plate electrode, a control electrode, a screen grid electrode, a suppressor grid electrode and a cathode electrode, a power source, a transformer having a primary winding electrically connected to said plate electrode, a secondary winding regeneratively coupled to the control grid electrode, and a tertiary winding adapted to be connected to an output load, biasing means electrically connected to said control grid electrode through said secondary winding for normally maintaining said vacuum tube in a non-conducting state, means for generating a control pulse, means for capacitively coupling said control pulse to said control grid electrode, means for electrically connecting said plate electrode through said primary winding to the power source, means for electrically connecting said suppressor grid and cathode electrodes to the power source, a source of unidirectional voltage electrically connected to said screen grid electrode, and means to vary the magnitude of said voltage whereby to control the width of a pulse at the output load.

3. An oscillator circuit comprising a pentode vacuum tube having a plate electrode, a control grid electrode, a screen grid electrode a suppressor grid electrode, and a cathode, a power source, a transformer having a primary winding electrically connected to said plate electrode and the power source, a secondary winding regeneratively coupled to the control grid electrode and electrically connected to the power source, and a tertiary winding adapted to be connected to an output load, a multi-grid trigger tube comprising at least a plate electrode, a control grid electrode, a screen grid electrode, and a cathode, the respective electrodes of said tubes being electrically connected such that said trigger tube and said pentode vacuum tube are essentially connected in parallel.

means for electrically connecting the cathodes of said tubes and said suppressor grid electrode to ground, biasing means electrically connected to said control grid electrodes of said pentode and trigger tube for normally maintaining said tubes in a non-conducting state, means for generating a control pulse, means for coupling said control pulse to said control grid electrodes of said trigger tube and pentode vacuum tube, a source of unidirectional voltage electrically connected to said screen grid electrodes of said pentode and trigger tube, and means to vary the magnitude of said voltage whereby to control the width of a pulse at the output load.

References Cited by the Examiner

UNITED STATES PATENTS

| | | | |
|---|---|---|---|
| 2,605,405 | 7/52 | Lentz | 328—58 |
| 2,849,610 | 7/58 | Umbach | 331—146 |
| 2,925,492 | 2/60 | Meyers et al. | 331—149 |
| 2,952,772 | 9/60 | Prescott | 328—58 |

FOREIGN PATENTS

| | | |
|---|---|---|
| 715,296 | 9/54 | Great Britain. |

ARTHUR GAUSS, *Primary Examiner.*

JOHN W. HUCKERT, *Examiner.*